(12) United States Patent
Mitchell

(10) Patent No.: US 7,137,642 B2
(45) Date of Patent: Nov. 21, 2006

(54) LOAD COUPLING APPARATUS FOR A WHEELED VEHICLE

(76) Inventor: Herman R. Mitchell, 4930 Strathaven Dr., Dayton, OH (US) 45324

( * ) Notice: Subject to any disclaimer, the term of this patent is extended or adjusted under 35 U.S.C. 154(b) by 332 days.

(21) Appl. No.: 10/702,715

(22) Filed: Nov. 6, 2003

(65) Prior Publication Data

US 2005/0098366 A1    May 12, 2005

(51) Int. Cl.
*B60P 1/64* (2006.01)
(52) U.S. Cl. .................. 280/418.1; 280/430; 414/481; 414/482
(58) Field of Classification Search ................ 180/209; 280/6.151, 33.996, 33.997, 406.2, 418.1, 280/423.1, 430, 656; 414/474, 476, 471, 414/481, 482
See application file for complete search history.

(56) References Cited

U.S. PATENT DOCUMENTS

| | | | | |
|---|---|---|---|---|
| 4,290,733 A | * | 9/1981 | Lahman | 414/476 |
| 4,490,089 A | * | 12/1984 | Welker | 414/483 |
| 4,765,642 A | * | 8/1988 | Struzina | 280/656 |
| 5,433,578 A | * | 7/1995 | Honan | 414/476 |
| 5,445,236 A | * | 8/1995 | Kuhn | 180/14.1 |
| 5,941,542 A | * | 8/1999 | Kalman | 280/38 |
| 6,164,683 A | * | 12/2000 | Kalman | 280/656 |
| 6,273,435 B1 | * | 8/2001 | Stringer | 280/6.151 |

* cited by examiner

*Primary Examiner*—Paul N. Dickson
*Assistant Examiner*—Toan C. To
(74) *Attorney, Agent, or Firm*—Mark A. Navarre

(57) ABSTRACT

A load coupling apparatus for a wheeled vehicle includes load linkage members that pivotally suspend the vehicle and load weight below the axles of the vehicle, allowing limited relative displacement of the axles and the load in the direction of vehicle travel. The load is displaced by moving the axles in the desired direction of travel, whereafter the suspended load follows the axles in a swinging motion as the effects of gravity overcome the load inertia. The effort required to initiate movement of the load is significantly reduced due to the relative displacement of the axles and the load, and the mechanical advantage afforded by the load linkage members. Once in motion, the load continues to track the axles in the direction of travel, providing continued reduction in motive effort even when the load reaches a constant forward speed.

5 Claims, 5 Drawing Sheets

LOAD COUPLING APPARATUS FOR A WHEELED VEHICLE

TECHNICAL FIELD

The present invention relates to load suspension in wheeled vehicles, and more particularly to a vehicle load coupling apparatus that reduces the effort required to move the vehicle and its load.

BACKGROUND OF THE INVENTION

The conventional approach to movement of a load by a wheeled vehicle, whether by road or rail, is to place the full weight of the load (including the vehicle frame and engine, if any) directly on the wheel axles. Although suspension system components such as springs and dampers are often used to isolate the load from the axle, the load and the various components of the vehicle are moved in unison in the direction of travel. This means that the motive power source, whether in the form of an internal combustion engine, an electric or hydraulic motor, or even manual labor, must expend sufficient energy to initiate movement of the entire weight of the vehicle and load. Various efforts have been made in the transportation industry to improve energy conversion efficiency and reduce frictional losses such as rolling resistance, but the improvements continue to be incremental in nature, and the overall rates of fuel consumption and combustion emission production remain unacceptably high. Accordingly, what is needed is a way of moving wheeled vehicles and their loads with reduced effort, leading to corresponding reductions in fuel consumption and combustion emission production.

SUMMARY OF THE INVENTION

The present invention provides a new and improved load coupling apparatus for coupling loads to the wheels of a wheeled vehicle. Fundamentally, the invention involves the use of load linkage members for pivotally suspending the load weight below the axles or center-points of the wheels, allowing limited relative displacement of the wheels and the load in the direction of vehicle travel. The load is displaced by moving the vehicle wheels in the desired direction of travel, whereafter the suspended load follows the wheels in a swinging motion as the effects of gravity overcome the load inertia. The effort required to initiate movement of the load is significantly reduced due to the relative displacement of the wheels and the load, and the mechanical advantage afforded by the load linkage members. Once in motion, the load continues to track the wheels in the direction of travel, providing continued reduction in motive effort even when the load reaches a constant forward speed. Dampers can be employed to control forward shifting of the load when the wheels are decelerated during braking. The apparatus can be applied to any wheeled vehicle, including manually operated vehicles, self-propelled vehicles, and trailered vehicles.

BRIEF DESCRIPTION OF THE DRAWINGS

The present invention will now be described, by way of example, with reference to the accompanying drawings, in which:

FIG. 1A presents an end or longitudinal view, while FIG. 1B presents a side or lateral view illustrating the operation of the load coupling apparatus of FIG. 1A.

FIG. 2A presents an end or longitudinal view, while FIG. 2B presents a side or lateral view illustrating the operation of the load coupling apparatus of FIG. 2A.

FIG. 3A presents an end or longitudinal view, while FIG. 3B presents a side or lateral view illustrating the operation of the load coupling apparatus of FIG. 3A.

FIG. 6A depicts the load coupling apparatus in a rest position, while FIG. 6B depicts the load coupling apparatus with the vehicle wheel displaced relative to the vehicle chassis.

DESCRIPTION OF THE PREFERRED EMBODIMENT

The present invention is described herein primarily in the context of roadway vehicles, and particularly semi-tractor-trailers. However, it will be understood that the invention is also directly applicable to other roadway vehicles, as well as to railway vehicles, and off-road vehicles such as agricultural vehicles, bicycles, etc.

Figure 1A:
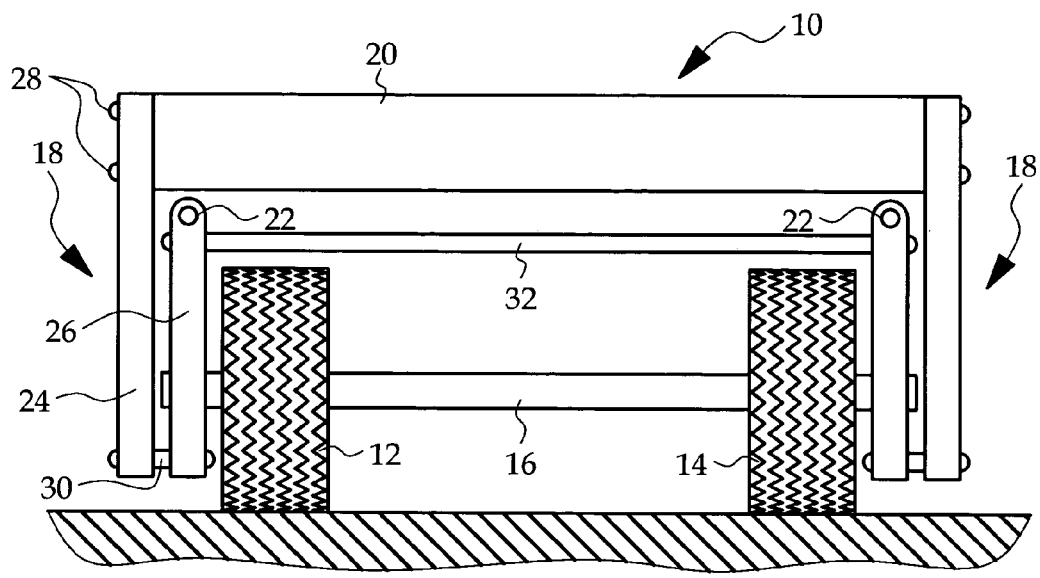
FIGS. 1A and 1B diagrammatically depict the axle of a trailered vehicle equipped with a load coupling apparatus according to a first embodiment of this invention.
Figure 1B:
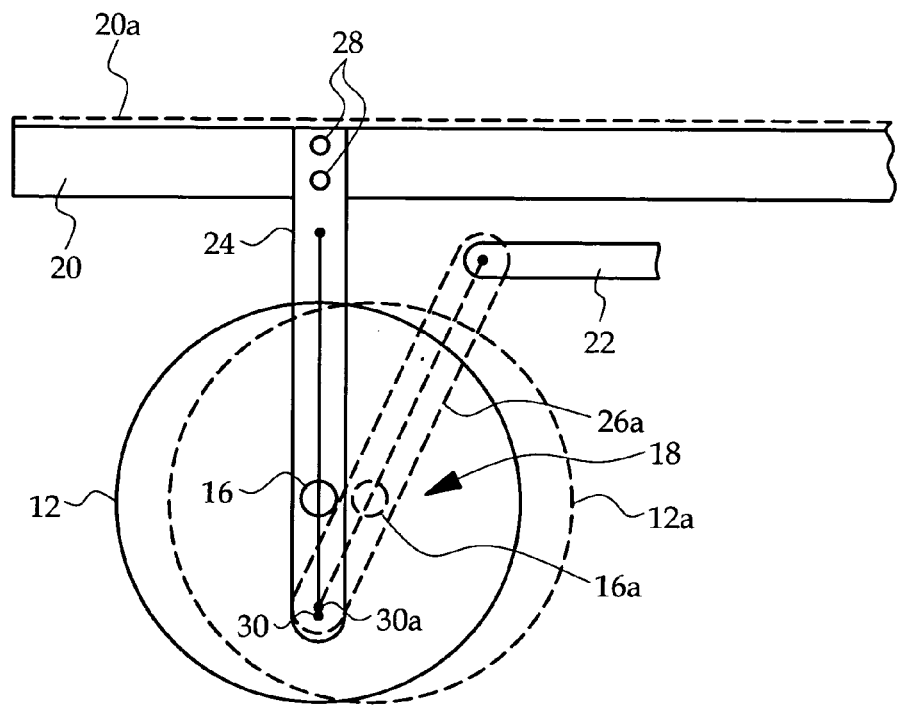

As indicated above, the present invention is fundamentally directed to a load coupling apparatus for pivotally suspending the load weight of a wheeled vehicle below the wheel axles or center-points so as to allow limited relative displacement of the wheels and the load in the direction of vehicle travel. In the case of a towed or trailered vehicle where there is no mechanism for driving the wheels, the wheel axles are displaced by a drawbar coupled to the towing vehicle. FIGS. 1A–1B, 2A–2B and 3A–3B depict three different possible mechanizations of a trailered vehicle load coupling apparatus, but it will be appreciated that other mechanizations are also possible. In general, FIGS. 1A–1B depict an embodiment of the load coupling apparatus in which the swinging linkage member pivots about the axle 16, and the drawbar is coupled to the swinging linkage member itself, whereas FIGS. 2A–2B and 3A–3B depict embodiments of the load coupling apparatus in which the swinging linkage member is hung from the axle 16, and the drawbar 22 is coupled to the wheel or axle. The drawbar may be directly coupled to the towing vehicle, or through a fifth-wheel assembly as illustrated in FIG. 4.

Figure 2A:
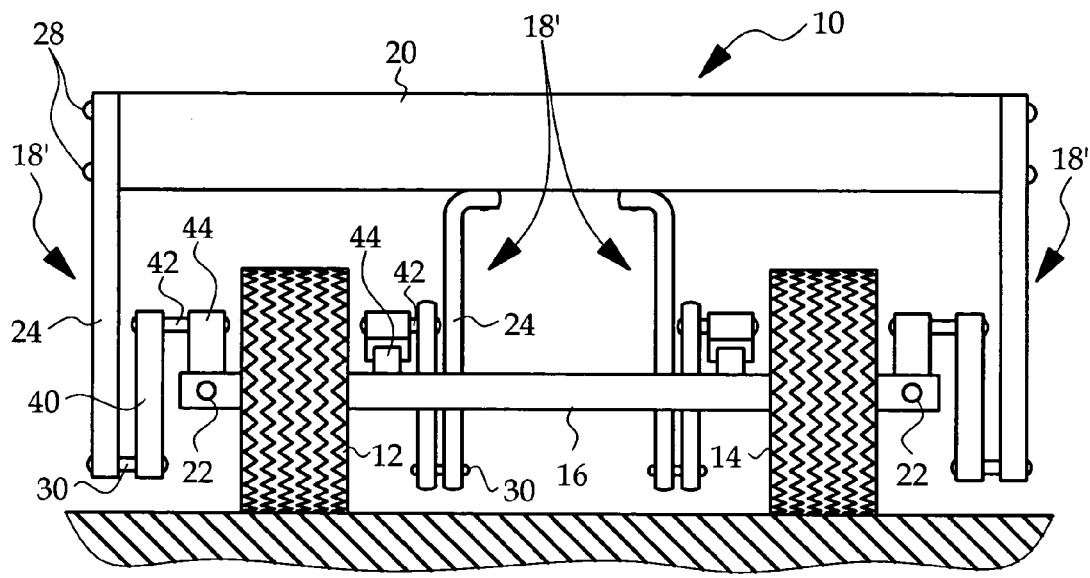
FIGS. 2A and 2B diagrammatically depict the axle of a trailered vehicle equipped with a load coupling apparatus according to a second embodiment of this invention.
Figure 2B:
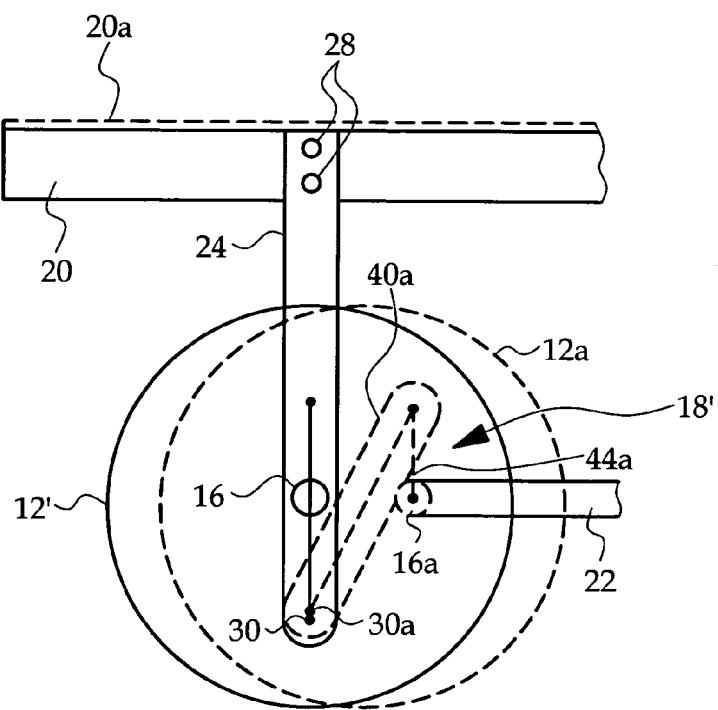
Figure 3A:
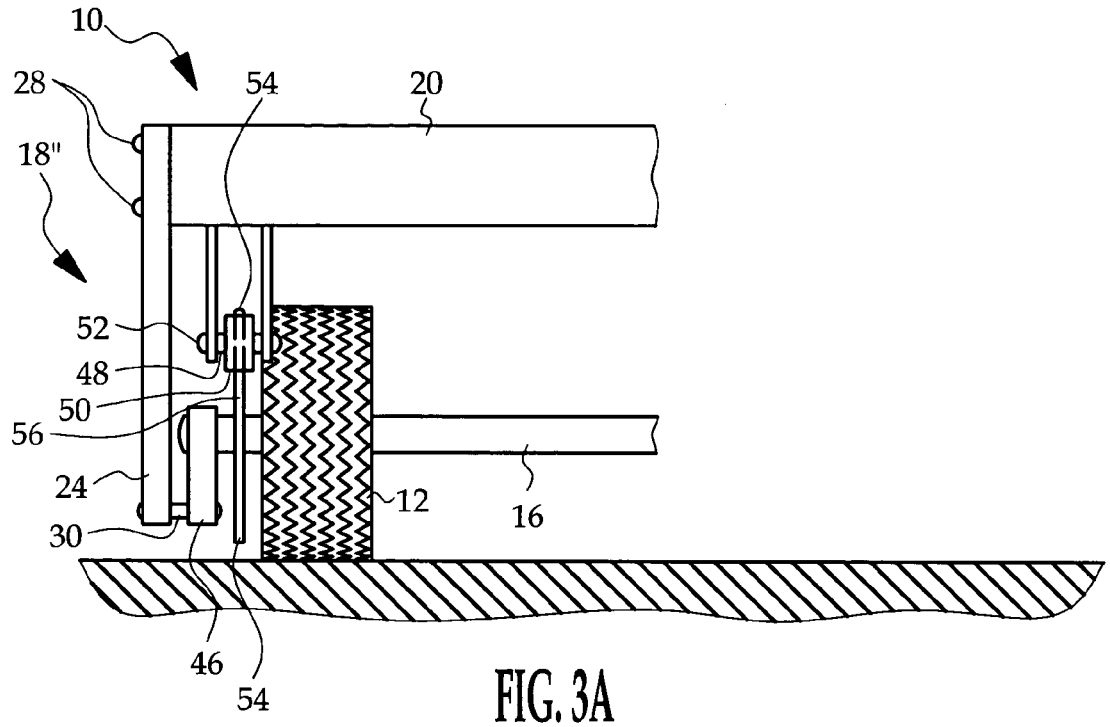
FIGS. 3A and 3B diagrammatically depict the axle of a trailered vehicle equipped with a load coupling apparatus according to a third embodiment of this invention.

In each of the FIGS. 1A, 2A and 3A, the reference numeral 10 generally designates a wheel/axle assembly of a trailered vehicle. The tire sets 12, 14 may each comprise one or more individual tires, and are supported on the axle 16 in the usual way. The load coupling apparatus (18 in FIGS. 1A–1B, 18' in FIGS. 2A–2B, and 18" in FIGS. 3A–3B) is symmetrical about the longitudinal axis of the trailer 10, and couples the trailer bed 20 to the axle 16. One or more drawbars 22 are coupled between the towing vehicle (not shown) and the load coupling apparatus or the wheel/axle assembly to impart motion to the trailer 10.

Referring particularly to the embodiment of FIGS. 1A–1B, each load coupling apparatus 18 includes two members: a load support member 24 and a swinging linkage member 26. A set of bolts or pins 28 rigidly couple the upper end of load support member 24 to the trailer bed 20, and a pin 30 rotatably couples the lower end of load support member 24 to the lower end of swinging linkage member 26. The swinging linkage member 26 is rotatably supported on the respective end of axle 16, and the drawbars 22 are coupled to the upper end of the swinging linkage member 26. Finally, a cross-bar 32 interconnects the swinging linkage members 26 on the left and right sides of trailer bed 20.

The side view of FIG. 1B illustrates the operation of the load coupling apparatus 18 when the drawbars 22 are initially pulled forward (i.e., to the right in FIG. 1B) by the towing vehicle. The lever action of swinging linkage member 26 amplifies the force applied to pin 30, but the force is predominantly applied to axle 16 due to the inertia of the trailer bed 20 and its load. The load coupling apparatus 18 allows movement of the axle 16 relative to the trailer bed 20, and the forward movement of drawbar 22 rotates the swinging linkage member 26 about axle 16 (as indicated by the dashed member 26a). The rotation of swinging linkage member 26 produces initial forward displacement of the axle 16 and tire set 12 (as indicated by the dashed members 12a, 16a and 26a), and slightly elevates the trailer bed 20 (as indicated by the pin position 30a and the dashed member 20a). The load support member 24 concentrates the weight of the trailer bed 20 and its load at the pin 30, and the weight creates a restoring force for repositioning the pin 30 directly under the axle 16. A forward component of this restoring force aids the force applied to drawbars 22 by the towing vehicle, and the trailer bed 20 begins to move forward as the forward force component overcomes the combined inertia of the trailer bed 20 and its load. While the initial rotation of the swinging linkage member 26 has been exaggerated in FIG. 1A for the sake of illustration, it is estimated that the forward component of the load weight will produce initial forward movement of the trailer bed 20 and its load upon forward rotation of the swinging linkage member 26 by 2–5 degrees. As the towing vehicle continues to pull the drawbars 22 forward, the trailer bed 20 and its load continue to track the axle 16 at a reduced displacement. Of course, an equivalent but opposite relative displacement of the axle and trailer bed 20 occurs when the towing vehicle pushes the drawbars 22 when operating in reverse. Although not depicted in FIGS. 1A–1B, a damper can be used to prevent or severely attenuate forward motion of the trailer bed 20 when the towing vehicle decelerates or brakes.

In the embodiment of FIGS. 2A–2B, the load coupling apparatus is designated by the reference numeral 18', and includes a swinging linkage member 40 that is hung from a pin 42 positioned above the axle 16. The pin 42 is supported on a stand-off member 44 that is either integral with the axle casting or rigidly secured thereto. Also, the drawbars 22 in this embodiment are coupled either directly to the axle 16 as shown, or to the stand-offs 44. In other respects, the load coupling apparatus 18' is similar to the load coupling apparatus 18 of FIGS. 1A–1B, and like reference numerals have been used to identify like elements.

In the illustration of FIG. 2A, the load coupling apparatus 18' is repeated not only at each end of axle 16, but also directly inboard of each tire set 12, 14. It will be noted that the pins 42 of each inboard load coupling apparatus 18' are positioned rearward of the axle 16 to prevent interference between the axle 16 and the respective linkage members 24 and 40 in the rest position. If the pins 42 are positioned such that the inboard load support members 24 abut the axle 16 in the rest position, relative displacement of the axle 16 and trailer bed 20 will not be possible when the towing vehicle operates in reverse, and the trailer bed 20 will not be able to shift forward of the axle 16 during forward motion of the trailer when the towing vehicle decelerates or brakes. If the inboard load coupling apparatuses 18' are omitted, relative displacement of the axle 16 and trailer bed 20 will occur during both forward and reverse operation of the towing vehicle, and a damper may be provided to prevent or severely attenuate over-center shifting of the trailer bed 20 when the towing vehicle decelerates or brakes.

The side view of FIG. 2B illustrates the operation of the load coupling apparatus 18' when the drawbars 22 are initially pulled forward (i.e., to the right in FIG. 2B) by the towing vehicle. The force applied to drawbars 22 produces forward motion of axle 16 and rotation of swinging linkage member 26 about pin 30 (as indicated by the dashed members 12a, 16a and 40a), slightly elevating the trailer bed 20 (as indicated by the pin position 30a and the dashed element 20a). The load support member 24 concentrates the weight of the trailer bed 20 and its load at the pins 30, and the weight creates a restoring force for repositioning the pins 30 directly under the respective pins 42. A forward component of this restoring force aids the force applied to drawbars 22 by the towing vehicle, and the trailer bed 20 begins to move forward as the forward force component overcomes the combined inertia of the trailer bed 20 and its load. As the towing vehicle continues to pull the drawbars 20 forward, the trailer bed 20 and its load continue to track the axle 16 at a reduced displacement.

Figure 3B:
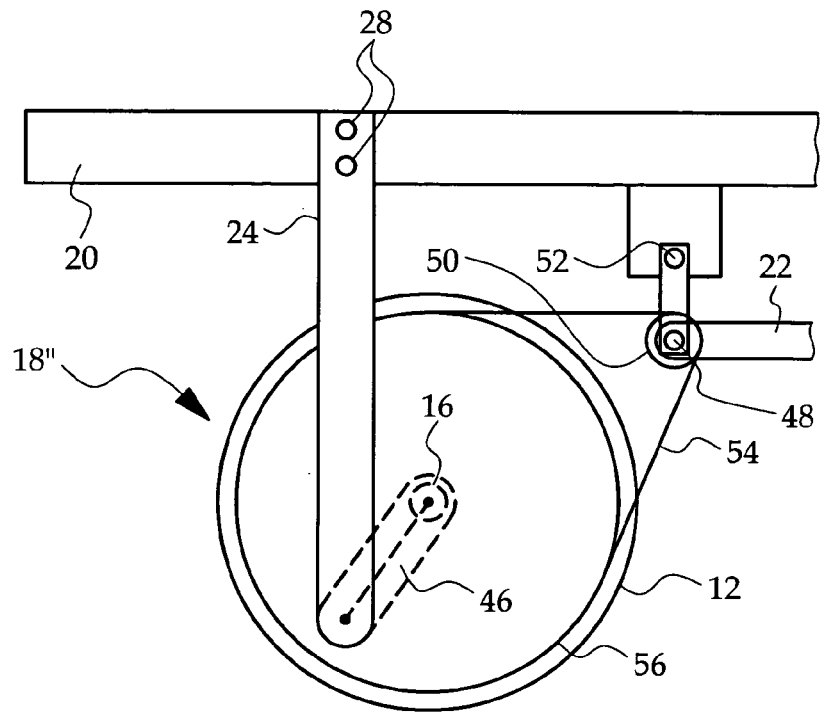
Figure 4:
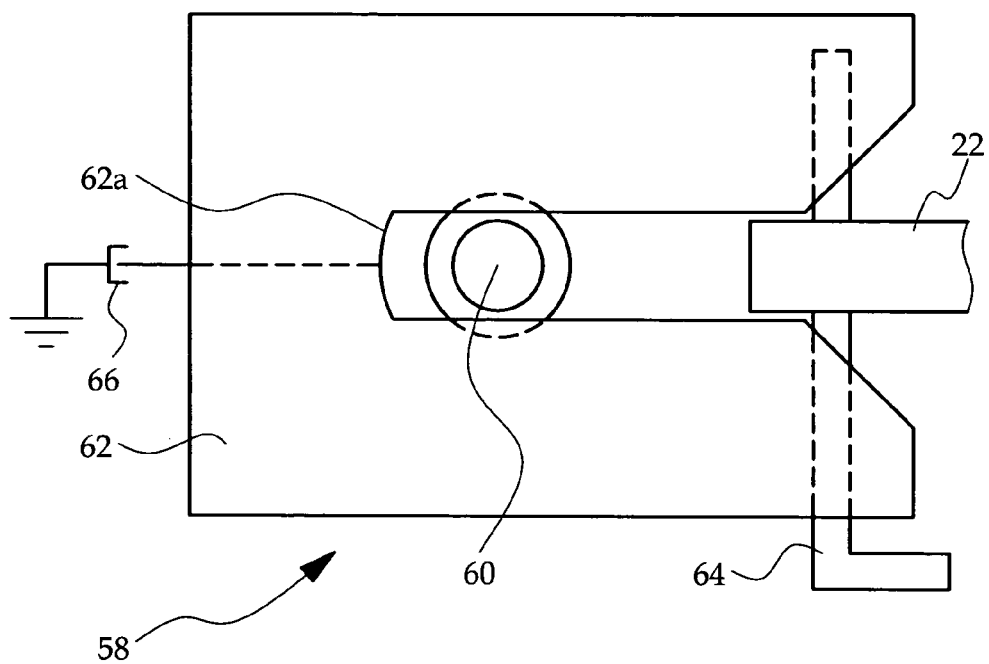
FIG. 4 depicts a fifth-wheel coupling for connecting a towing vehicle to the trailered vehicles of FIGS. 1A–1B, 2A–2B and 3A–3B.

In the embodiment of FIGS. 3A–3B, the load coupling apparatus is designated by the reference numeral 18", and includes a swinging linkage member 46 that is hung from the axle 16 or wheel 12. The drawbars 22 are coupled to the hub 48 of a small sprocket 50 that pivots about a pin joint 52 on trailer bed 20, and a chain 54 couples the sprocket 50 to a large sprocket 56 rigidly secured to the axle 16. Alternatively, the sprockets 50, 56 and chain 54 may be replaced with similarly sized pulleys and a belt. The small sprocket 50 is positioned near the upper periphery of the large sprocket 56 so that the force exerted on drawbar 22 by the towing vehicle is essentially applied to the top of the sprocket 56, providing increased mechanical advantage compared to the embodiment of FIGS. 2A–2B, for example. In other respects, the load coupling apparatus 18" is similar to the load coupling apparatus 18 of FIGS. 1A–1B, and like reference numerals have been used to identify like elements. FIG. 3B depicts the load coupling apparatus 18" following an initial forward movement of the drawbar 22 and axle 16.

While the drawbars 22 for the above-described embodiments of the load coupling apparatus may be attached directly to the towing vehicle, FIG. 4 illustrates a preferred implementation in which the drawbars 22 are connected to the towing vehicle via a modified fifth-wheel coupling. Referring to FIG. 4, the reference numeral 58 designates a portion of a fifth-wheel coupling in which a hitch pin 60 is received in a slot 62a of a skid plate 62 mounted on the towing-vehicle. The drawbar 22 is coupled to the skid plate 62 by the pin 64 near the open end of the slot 62a, creating a lost-motion coupling between the hitch pin 60 and the skid plate 62. The hitch pin 60 is initially in a forward position as shown in FIG. 4, and forward movement of the towing vehicle produces a pulling force on the drawbar 22 without applying any forward force to the hitch pin 60. The hitch pin 60 will move back and forth in the slot 62a with the relative displacement of the load coupling apparatus 18, 18', 18", and its steady-state position within the slot 62a will be a function of road grade, air resistance, and so forth. A damper mechanism 66 such as a shock absorber or the like couples the hitch pin 60 to the chassis of the towing vehicle to prevent or severely attenuate forward shifting of the trailer bed and its load when the towing vehicle decelerates or brakes (in embodiments where such motion is possible).

Figure 5:
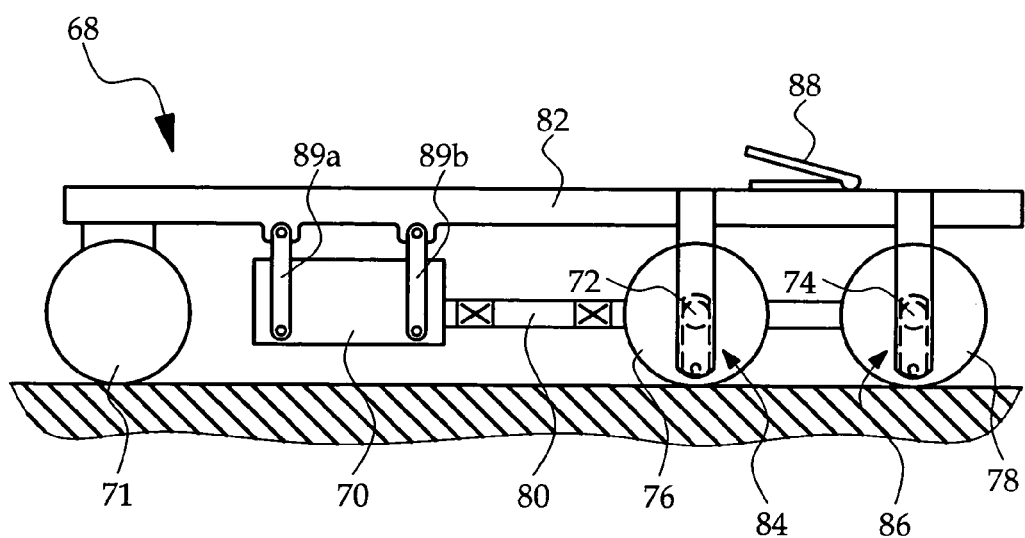
FIG. 5 illustrates an application of the present invention to a tractor of a tractor-trailer vehicle.

FIG. 5 depicts an application of the load coupling apparatus of the present invention to a towing vehicle 68, such as the tractor of a tractor-trailer vehicle. In such vehicles, an engine or motor 70 provides motive power by rotating one or more drive wheels of the vehicle, and there is no need for a drawbar such as used for trailered vehicles. In the embodiment of FIG. 5, the towing vehicle 68 has a front wheel set 71, and tandem rear axles 72, 74, with rear wheel sets 76, 78. The engine 70 drives the rear axles 72, 74 through a conventional drivetrain including a jointed drive shaft 80 and a differential gearset (not shown). The vehicle chassis 82 is coupled to the front wheel set 71 in a conventional manner, and to each of the rear axles 72, 74 using load coupling apparatuses 84, 86 according to this invention. For example, the load coupling apparatuses 84, 86 may be constructed as shown in FIGS. 2A–2B or 3A–3B, but without the drawbars 22. A fifth wheel assembly 88 such as depicted in FIG. 4 is attached to the chassis 82 for coupling to a trailer hitch pin. Finally, the engine 70 is pivotably suspended from the chassis 82 via the swing arms 89a, 89b, which of course are repeated on the opposite side of engine 70. In operation, the application of motive power from the engine 70 to the rear axles 72, 74 produces a forward movement of the axles 72, 74 and engine 70 relative to the chassis 82, after which the chassis 82 and load follow once the swinging linkage members of the load apparatuses 84, 86 develop enough forward force to overcome the inertia of the suspended weight.

Figure 6A:
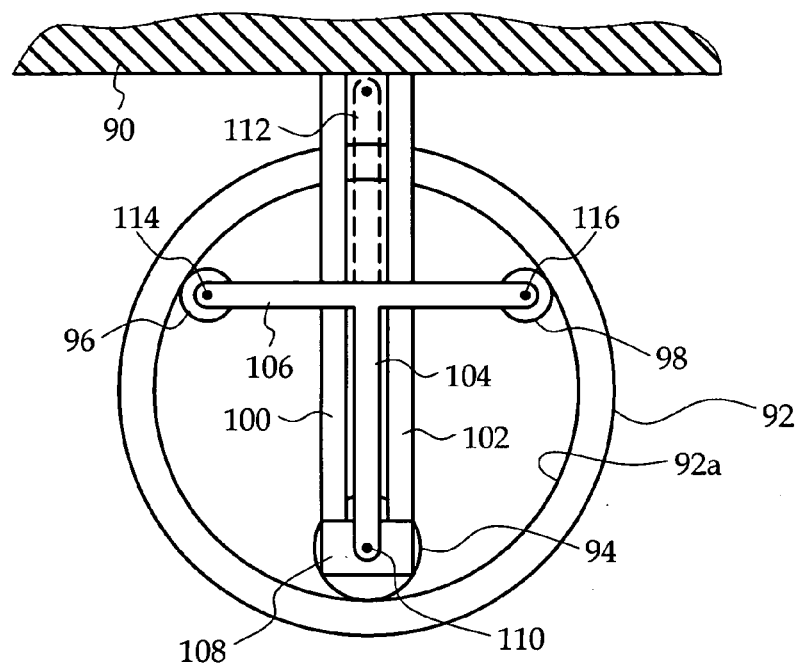
FIGS. 6A–6B diagrammatically depict the chassis and wheel of a vehicle equipped with a load coupling apparatus according to a fourth embodiment of this invention.
Figure 6B:
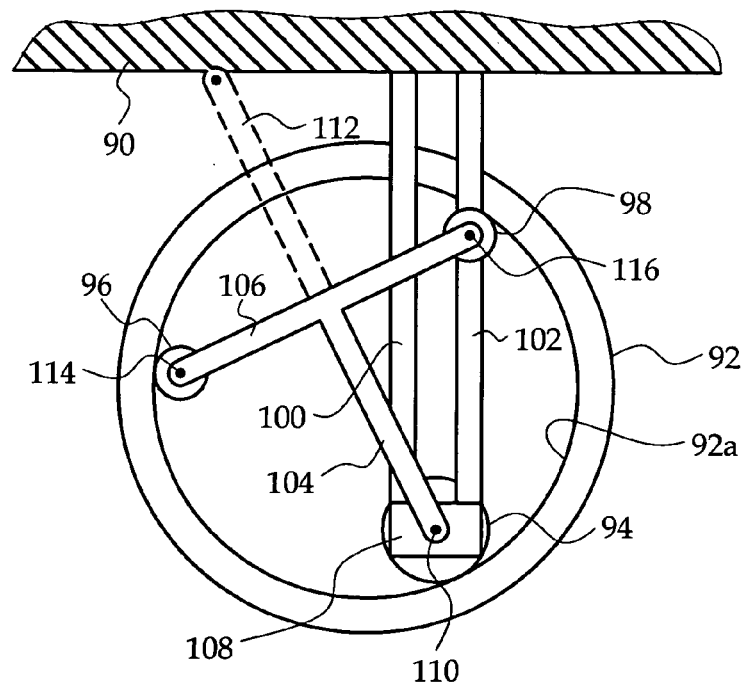

Finally, FIGS. 6A–6B depict an embodiment of the load coupling apparatus of the present invention that is well suited to both trailered vehicles (including manually towed vehicles) and manually powered vehicles such as wheelchairs and the like. Ordinarily, of course, the weight of the vehicle chassis 90 and load is mounted on the wheel axles. In the case of a wheelchair, the user grasps the top of the wheel 92 and pushes it forward or rearward to initiate movement. Although the wheel afford a mechanical advantage that multiplies the user's force, the applied force has to be sufficient to initiate movement of the entire weight of the vehicle and its occupant (load), just as in the case of any conventional vehicle.

Referring particularly to FIG. 6A, the wheel 92 is essentially a cylinder having an inner periphery 92a on which ride three idler wheels: a follower wheel 94 and a pair of offset wheels 96 and 98. Alternatively, the idler wheels 94, 96, 98 may be constructed as pulleys, and the inner wheel periphery 92a notched to constrain lateral movement of the pulleys. The load coupling apparatus comprises load support members 100, 102, a swinging linkage member 104, and an offset wheel arm 106 which may be integral with swinging linkage member 104. The load support members 100, 102 are rigidly fastened to the chassis 90, and to a support plate 108 welded to the axle hub of follower wheel 94. The swinging linkage member 104 is pivotably coupled to the plate 108 on pin joint 110, and the offset wheel arm 106 supports the offset wheels 96, 98 on the pins 114, 116 at its opposing extremities, allowing the swinging linkage member 104 and offset arm 106 pivot as the wheel 92 is displaced with respect to the chassis 90 as shown in FIG. 6B. If the vehicle is a trailered vehicle, the swinging linkage member 104 can be extended upward as illustrated in phantom and designated by the reference numeral 112; in this case, a drawbar (not shown) pulls the top of swinging linkage member 104 forward, producing the relative displacement illustrated in FIG. 6B. Alternatively, a belt or chain drive arrangement of the type depicted in FIGS. 3A–3B could be utilized. If the vehicle is not a trailered vehicle, the upper extension of swinging linkage member 104 is omitted, and the swinging linkage member 104 pivots as shown in FIG. 6B when the wheel 92 is rotated forward. Rotation of the wheel 92 may be achieved either by hand, as in the case of a typical wheelchair, or by machine, in which case an electric (or hydraulic) motor is directly or indirectly coupled to the wheel 92. In either case, the chassis 90 raises slightly as the follower wheel 94 tracks the inner periphery 92a of wheel 92. The combined weight of the chassis 90 and load are concentrated at the pin joint 110, producing a force in the desired direction of travel, and when that force overcomes the inertia of the chassis 90 and load, the chassis 90 and load support members 100, 102 will move forward in a swinging motion. As with the other vehicles depicted herein, the chassis 90 and load support members 100, 102 will tend to lag the center of the wheel 92 so long as the wheel 92 is being pulled or pushed forward, and the return to the rest position depicted in FIG. 6A. Movement in the opposite direction is initiated in much the same way by pulling the swinging linkage member extension 112, or pushing the wheel 92, to the right as viewed in FIGS. 6A–6B.

It will be appreciated that the load coupling apparatus of this invention is also applicable to tracked vehicles such as tanks where a rubber or steel track encircles front and rear wheels of a vehicle. In such an application, the load coupling apparatus of FIGS. 6A–6B may be applied to both front and rear wheels of the vehicle. In a particularly advantageous configuration, only one of the front and rear wheels is motor-driven, and the swinging linkage members of the front and rear wheels are coupled by a mechanical or hydraulic link (a drawbar, for example) so that the motor effectively drives both front and rear wheels.

In summary, the present invention provides an improved load coupling apparatus that significantly reduces the effort required to initiate and maintain movement of a wheeled vehicle. As applied to a manually propelled vehicle such as a wheelchair, the user effort level is significantly reduced, making the wheelchair so equipped particularly beneficial to persons with limited upper body strength. As applied to trailered and towing vehicles, the peak motive power requirements are significantly reduced, contributing to substantial improvements in fuel economy and emissions, and lower initial powertrain expense. While the invention has been described in reference to the illustrated embodiments, it should be understood that various modifications in addition to those mentioned above will occur to persons skilled in the art. Accordingly, it will be understood that systems incorporating these and other modifications may fall within the scope of this invention, which is defined by the appended claims.

The invention claimed is:

1. Apparatus for a wheeled vehicle including a load and an axle, the apparatus cornprising:
   a swinging linkage member rotatable about a pivot location on said axle, and pivotably supporting said load at a point below the pivot location on said axle to allow swinging motion of said load with respect to said pivot location due to movement of the vehicle; and
   drive means for producing horizontal displacement of said axle in a forward direction that produces swinging motion of said load rearward of said axle, whereafter said load swings back in the forward direction to follow said axle.

2. The apparatus of claim 1, including a load support member rigidly coupled to said load, said load support member being pivotably coupled to said swinging linkage member at said point below the pivot location on said axle.

3. The apparatus of claim 1, wherein said vehicle is a trailered vehicle, the drive means includes a drawbar coupled to said swinging linkage member, and said drawbar is moved in said forward direction to drive said axle in said forward direction.

4. Apparatus for coupling a load to an axle of a wheeled vehicle, comprising:
  a load support member rigidly coupled to said load;
  a swinging linkage member having a first end pivotably coupled to said load support member and a second end, said swinging linkage member being rotatably supported by said axle intermediate said first end and said second end; and
  drive means coupled to the second end of said swinging linkage member for driving the axle in a desired direction of travel by moving the second end of said swinging linkage member in said desired direction of travel, thereby producing relative displacement of said axle with respect to said load as said swinging linkage member pivots with respect to said load support member, whereafter said load and load support member move in said desired direction of travel.

5. The apparatus of claim 4, wherein said drive means includes a drawbar coupled to the second end of said swinging linkage member.

* * * * *